US008494761B2

(12) United States Patent
Giovannini et al.

(10) Patent No.: US 8,494,761 B2
(45) Date of Patent: Jul. 23, 2013

(54) METHOD AND DEVICE FOR AIDING THE EVALUATION OF A FLIGHT TRAJECTORY INTENDED TO BE FOLLOWED BY AN AIRCRAFT IN A CONSTRAINED ENVIRONMENT

(75) Inventors: Andrea Giovannini, Toulouse (FR); Thomas Pastre, Caluire et Cuire (FR)

(73) Assignee: Airbus Operations (SAS), Toulouse Cedex (FR)

( * ) Notice: Subject to any disclaimer, the term of this patent is extended or adjusted under 35 U.S.C. 154(b) by 0 days.

(21) Appl. No.: 13/307,984

(22) Filed: Nov. 30, 2011

(65) Prior Publication Data

US 2012/0143487 A1 Jun. 7, 2012

(30) Foreign Application Priority Data

Dec. 7, 2010 (FR) ...................................... 10 60192

(51) Int. Cl.
*G06F 17/00* (2006.01)

(52) U.S. Cl.
USPC ........... 701/301; 701/300; 701/409; 701/448; 701/528; 701/532; 340/936; 340/940; 340/945; 340/961; 340/963; 244/75.1; 244/175; 342/29

(58) Field of Classification Search
USPC .................. 701/1, 3, 4, 5, 7, 8, 9, 10, 14, 16, 701/120, 122, 300, 301, 409, 448, 528, 532, 701/533; 340/936, 940, 945, 961, 963, 971, 340/973, 979; 244/75.1, 175; 342/29
See application file for complete search history.

(56) References Cited

U.S. PATENT DOCUMENTS

| | | | | |
|---|---|---|---|---|
| 8,032,266 | B2 * | 10/2011 | Bitar et al. | 701/3 |
| 8,229,604 | B2 * | 7/2012 | Villaume et al. | 701/3 |
| 8,249,799 | B2 * | 8/2012 | Flotte et al. | 701/301 |
| 8,275,499 | B2 * | 9/2012 | Coulmeau et al. | 701/14 |
| 8,306,678 | B2 * | 11/2012 | Fleury et al. | 701/9 |
| 2007/0182589 | A1 | 8/2007 | Tran | |

FOREIGN PATENT DOCUMENTS

| | | |
|---|---|---|
| FR | 2913800 | 9/2008 |
| FR | 2923008 | 5/2009 |
| WO | 2005057133 | 6/2005 |

OTHER PUBLICATIONS

French Patent Office, French Search Report FR 1060192, Sep. 8, 2011 (2 pgs).

* cited by examiner

*Primary Examiner* — McDieunel Marc
(74) *Attorney, Agent, or Firm* — Wood, Herron & Evans, LLP

(57) ABSTRACT

A device and method aids the evaluation of a flight trajectory that is intended to be followed by an aircraft within a constrained environment. The method includes receiving information from a processing unit regarding stationary and moving obstacles, implementing a collision trial based on this information, and displaying any collision risks to the pilot on a display device in the cockpit. Consequently, a pilot can know within the constrained environment whether a flight trajectory needs to be modified to avoid potential collisions.

15 Claims, 3 Drawing Sheets

METHOD AND DEVICE FOR AIDING THE EVALUATION OF A FLIGHT TRAJECTORY INTENDED TO BE FOLLOWED BY AN AIRCRAFT IN A CONSTRAINED ENVIRONMENT

TECHNICAL FIELD

The application relates to a method and a device for aiding the evaluation of a flight trajectory intended to the followed by an aircraft, in particular a transport airplane, in a constrained environment.

BACKGROUND

Within the context of the application, a constrained environment means an environment (or zone of the space with a given shape and size) being defined around the position of the aircraft and being able to contain objects (or obstacles), with which the aircraft should avoid getting into collision, including for obvious safety reasons or merely for flight comfort reasons, these objects being either stationary objects such as mountains or hills or mobile (or dynamic) objects such as meteorological disturbance zones, including stormy zones or other aircrafts.

The method described below applies to any type of flight trajectory being intended to be followed by an aircraft. It could be, in particular, a flight trajectory transmitted by the flight management system of the aircraft or by another usual system able to provide a prediction of the geometry of the future trajectory. It could also be a deposited flight plane or a trajectory generated during the flight phase.

The method described below aims at giving the pilots of the aircraft the possibility to evaluate the validity of the flight trajectory being considered in a dynamic environment (with a stormy zone or other airplanes progressing in the same space for instance) with the object, including, to support the crew in making on board a decision in such a constrained environment.

There is no tool for supporting or aiding the evaluation of a trajectory in aircraft cockpits. In particular, a usual navigation display of the ND (<<Navigation Display>>) type displays the current flight plane, but does not supply any information regarding, for instance, margins associated with this flight plane.

The method described below aims at remedying these drawbacks. It relates to a method for aiding the crew of an aircraft, in particular of a transport airplane, to evaluate any flight trajectory being intended to be followed by this aircraft in a constrained environment, that is in an environment able to contain stationary and mobile obstacles.

SUMMARY

The device of this application is remarkable in that:

A/ at least one first database containing mobile obstacles and at least one second database containing stationary obstacles are taken into consideration, relative at least to the environment of the aircraft, a plurality of successive points is automatically determined of said flight trajectory, referred to as trial points, and the following operations are automatically implemented, and this individually for each one of said successive trial points of said flight trajectory:

a) the passage time of the aircraft is estimated at the trial point being considered;

b) the positions of the mobile obstacles are extrapolated at said passage time, by means of said first database; and c) a collision trial is implemented for checking whether a trial vector, being provided perpendicularly to a shifting vector of the aircraft at said trial point, intercepts, on the one hand mobile obstacles at extrapolated positions at said passage time, and on the other hand stationary obstacles of said second data base, and critical points are determined on opposite sides of the trial point being considered, depending on the result of said collision trial;

B/ the thus determined critical points are automatically linked together so as to form a zone, referred to as a free zone, around said flight trajectory; and C/ said flight trajectory is automatically presented on a display of the aircraft, as well as, associated with this flight trajectory, said free zone allowing to aid to evaluate the flight trajectory.

Thus, a display is provided emphasizing a zone being free of any obstacle around a flight trajectory being defined in a dynamic environment. This free zone illustrates the possible maneuver margin of the aircraft on the whole flight trajectory. Displaying this zone on a viewing screen of the cockpit thereby allows the crew, and including the pilot(s), to carry out a very quick evaluation of the piloting complexity on the trajectory being considered.

The method has more specifically the following advantages:

- it therefore allows to support the crew in making a decision on board. The pilot's extrapolation ability does not necessarily allow him to evaluate whether the flight trajectory being followed is free of collision with a dynamic obstacle (for example a stormy cell) moving in a tactical horizon. The method includes analyzing the potential evolutions of the environment and presents, by means of a simple display, the information allowing to evaluate the validity of the trajectory; and
- in addition to analyzing whether the trajectory goes through a zone being considered as hazardous, the method provides a freedom zone (free zone) on the whole trajectory, representing the maneuver margin of the aircraft. Displaying this zone on a viewing screen allows the crew to rapidly carry out an evaluation of the characteristics and of the hazards along the trajectory being considered.

The method therefore provides a single display representing all the evolutions of the environment with respect to the flight trajectory in a given time window.

It is possible to implement said collision trial in a horizontal (side) plane or in a vertical plane. However, in a preferred embodiment, the collision trial is simultaneously implemented both in the horizontal and vertical planes so as to determine and provide a free zone being defined in the whole space around the flight trajectory being considered.

Furthermore, advantageously, if a part of the flight trajectory goes through any (stationary or mobile) obstacle of one of said first and second databases, this situation is emphasized on the display achieved at step C/, in particular by an absence of free zone and an overgloss of the part of the trajectory being impacted.

Moreover, advantageously:

- at step A/, successive points are automatically determined, as trial points, along the flight trajectory, being separated one from the other, each time, by a constant distance; and/or
- at step A/a), the passage time at the trial point being considered is estimated as a function of the passage time estimated at the previous trial point and of an estimated speed of the aircraft.

For implementing the method described below, one or more first databases are used containing mobile (or dynamic) obstacles. In particular, advantageously, at step A/:

a first database is taken into consideration containing mobile obstacles representing meteorological disturbance zones. In this case, at step A/b), the position of each one of said mobile obstacles is extrapolated at said passage time, taking into consideration determining points defining the limits of meteorological disturbance zones and of wind speed vectors illustrating the shift of the wind at said determining points, these determining points and these speed vectors being issued from said first database; and/or a first database is taken into consideration containing mobile obstacles representing surrounding aircrafts. In this case, at step A/b), the position of each one of said mobile obstacles is extrapolated at said passage time, taking into consideration information relative to the flight of said surrounding aircrafts, including flight planes, being issued from said first database. For implementing such an extrapolation, other information can also be used, as set forth below.

Furthermore, advantageously, at step A/c):

a trial vector is used having a predetermined length; and/or a collision trial is implemented for the extrapolated positions of the mobile obstacles at two successive instants corresponding to the extreme times of a time window being defined compared to said passage time.

Moreover, advantageously, at step A/c), upon a collision trial:

if the trial vector does not meet any obstacle, the critical point is located (and defined) at the end of said trial vector; and if the trial vector meets at least one obstacle, the critical point is located (and defined) at the position of the obstacle being the closest to the trial point being considered.

This application further relates to a device for aiding the crew of an aircraft, in particular of a transport airplane, to evaluate any flight trajectory being intended to be followed by this aircraft in a constrained environment, that is in an environment able to contain stationary and mobile obstacles.

The device is remarkable in that it comprises:

at least one first database containing mobile obstacles, relative at least to the environment of said aircraft, said mobile obstacles representing more specifically meteorological disturbance zones and/or surrounding aircrafts;

at least one second database containing stationary obstacles, relative at least to the environment of said aircraft;

devices for automatically determining a plurality of successive points of the flight trajectory, referred to as trial points;

devices for estimating the passage time of the aircraft at each one of the trial points;

extrapolation means for extrapolating the positions of mobile obstacles at said passage time, by means of said first database;

a device for implementing a collision trial with the aim to check whether a trial vector, being provided perpendicularly to a shifting vector of the aircraft at the trial point, intercepts, on the one hand mobile obstacles at extrapolated positions at the passage time, and on the other hand stationary obstacles of the second database, and for determining critical points on opposite sides of the trial point being considered, as a function of the result of the collision trial;

a device for automatically presenting, on a viewing screen of the aircraft, the flight trajectory, as well as, associated with the latter, a free zone linking together the critical points and allowing to aid to evaluate the flight trajectory.

The device allows to represent the complexity of an evolutionary environment (a situation wherein the pilot's extrapolation ability is not satisfactory for representing the time dependent space freedom) by a simple display, the main information being the freedom zone (referred to as a free zone) being associated with the flight trajectory in a dynamic environment. The device thereby allows to aid the crew of the aircraft in evaluating and validating flight trajectories in a constrained environment.

The application further relates to an aircraft, in particular a transport airplane, provided with an aiding device such as mentioned hereinabove.

BRIEF DESCRIPTION OF THE DRAWINGS

The FIGS. of the appended drawing set will better explain how this invention can be implemented. In these FIGS., like reference numerals relate to like components.

DETAILED DESCRIPTION

Figure 1:
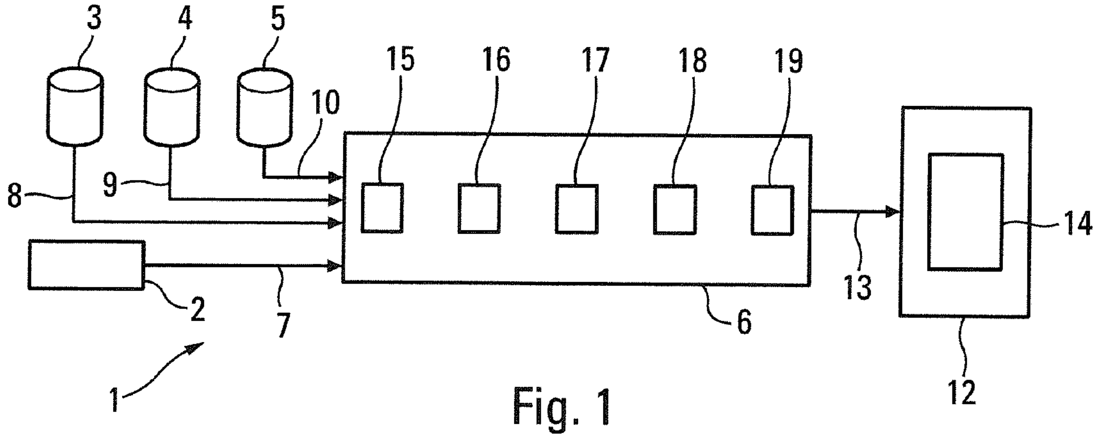
FIG. 1 is a block diagram of a device.

The device 1 schematically shown on FIG. 1, aims at aiding the crew of an aircraft (not shown), in particular of a transport airplane, to evaluate any flight trajectory TV being intended to be followed by this aircraft in a constrained environment. A constrained environment means an environment being able to contain objects or obstacles O1, O2, with which the aircraft should avoid getting into collision. These obstacles may be either stationary obstacles O1 such as mountains or hills or even mobile (or dynamic) obstacles O2 such as meteorological disturbance zones, including stormy zones or other aircrafts.

The device 1 being on board the aircraft includes, as shown on FIG. 1:

a set 2 of information sources for transmitting data, and including the flight trajectory TV being considered;

at least one first database 3, 4 containing mobile obstacles O2 located in the environment of the flight trajectory TV, and preferably a database 3 containing information on mobile obstacles O2 representing meteorological disturbance zones and a database 4 containing information on mobile obstacles O2 representing surrounding aircrafts;

at least one second database 5 containing stationary obstacles O1 located in the environment of the flight trajectory TV;

one processing unit 6 being linked via links 7 to 10 respectively to the set and the databases 2 to 5 and being formed so as to determine, in particular, a free zone ZL allowing to aid evaluating the flight trajectory TV, as set forth below; and a display device 12 being linked via a link 13 to the processing unit 6 and being formed so as to automatically present, on a viewing screen 14 of the cockpit of the aircraft, the flight trajectory TV, as well as, associated to this flight trajectory TV, the free zone ZL.

Moreover, the processing unit 6 includes:

a trial point determination device 15 for automatically determining a plurality of successive points of said flight trajectory TV, referred to as trial points Pt;

a passage time estimation device 16 for estimating the passage time of the aircraft at each one of the trial points Pt;

an extrapolation device 17 for extrapolating the positions of the mobile obstacles O2 at the passage time, by the databases 3 and 4;

a trial implementation device 18 for implementing a collision trial with the aim to check whether a trial vector 22, being provided perpendicularly to a shifting vector 20 of the aircraft at the trial point Pt, intercepts, on the one hand mobile obstacles O2 at extrapolated positions at the passage time, and on the other hand stationary obstacles O1 of the second database 5, and for determining critical points on opposite sides of the trial point Pt being considered, depending on the result of the collision trial; and an outlining device 19 for linking together the thus determined critical points Pc so as to form the limits (or outline) 21 of the free zone ZL.

Thus, the device 1 provides a display (FIGS. 7 and 8) emphasizing a zone ZL being free from any obstacle around a flight trajectory TV being defined in a dynamic environment. This free zone ZL illustrates the possible maneuver margin of the aircraft on the whole flight trajectory TV. Displaying this zone ZL on a viewing screen 14 of the cockpit thereby allows the crew, including the pilot(s) to carry out a very quick evaluation of the piloting complexity on the trajectory being considered.

The above mentioned operations can be implemented in a horizontal plane or in a vertical place. However, in a preferred embodiment, the operations are simultaneously implemented both in the horizontal and vertical planes so as to determine and provide a free zone ZL being defined in the whole space around the flight trajectory TV being considered.

As set forth below, the processing unit 6 operates in an iterative way. It provides a number of distinct positions (trial points Pt) on the trajectory TV as a function of a predefined incrementation. For each one of these positions, it provides an estimation of the passage time, based on the predictions achieved by a flight management system integral for example, with the set 2. It then generates a representation of the environment at the estimated time, such a representation being used as a reference for measuring the critical distances compared to the obstacles O1, O2. Displaying all the critical points Pc for each one of the positions (trial points Pt) on the trajectory TV allows the representation, in one single display, of potential evolutions of the environment with respect to the trajectory written in a time window.

A detailed description of the characteristics is carried out hereinafter for the side (horizontal) plane, the implementation being similar for the vertical plane.

The processing unit 6 thus relies on reference information issued from the following information sources:

the database 5 of the ground, representing stationary, constraints;

the meteorological database 3. This information could be issued from the on-board meteorological monitoring or be received via a usual link of data transmission;

the database 4 relative to surrounding aircrafts, containing the flight planes and the predictions of the aircrafts identified in a given perimeter; and the set 2 supplying, more particularly, the current flight trajectory TV, followed by the aircraft (on-board which the device 1 is arranged).

The device 1 thus relies on two types of separately processed databases:

a stationary database 5, representing obstacles O1 the position of which does not progress during the flight; and dynamic databases 3 and 4, representing all the moving obstacles O2 that the operator wishes to take into consideration in his evaluation.

The stationary obstacles base 5 contains discretizations of obstacles O1. The representation is a polygonal projection on the ground, associated with a limit height.

The dynamic bases 3, 4 integrate, as far as they are concerned, additional information regarding the evolution of the zones.

Figure 2:
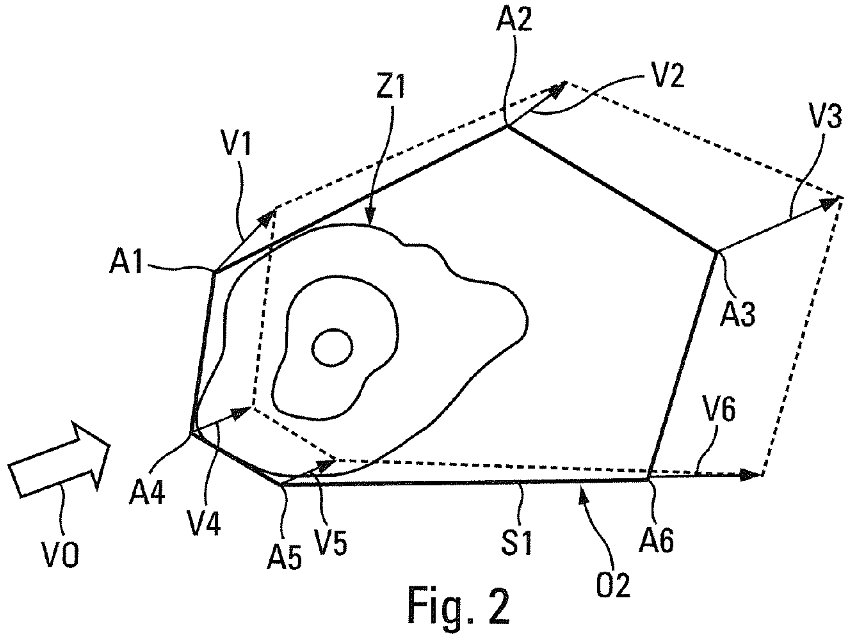
FIGS. 2 to 6 are diagrams for explaining the determination of a free zone being associated with a flight trajectory of an aircraft.

For stormy zones Z1, the information is produced by an analysis of the recent evolution of the zones (analysis of the meteorological monitoring or of data transmitted by a data transmission link for example). This analysis produces, for each building point A1 to A6 (referred to as a determining point) of the polygonal surface S1 (forming the mobile object or obstacle O2), a mean shifting vector V1 to V6 being measured, as shown on FIG. 2. On this FIG. 2, a wind speed vector V0 is also emphasized.

As far as aircrafts are concerned being in a potential conflict with the trajectory TV being considered (database 4), they are each time associated with a flight plane, a speed profile and a hazard zone width around the aircraft.

Figure 3:
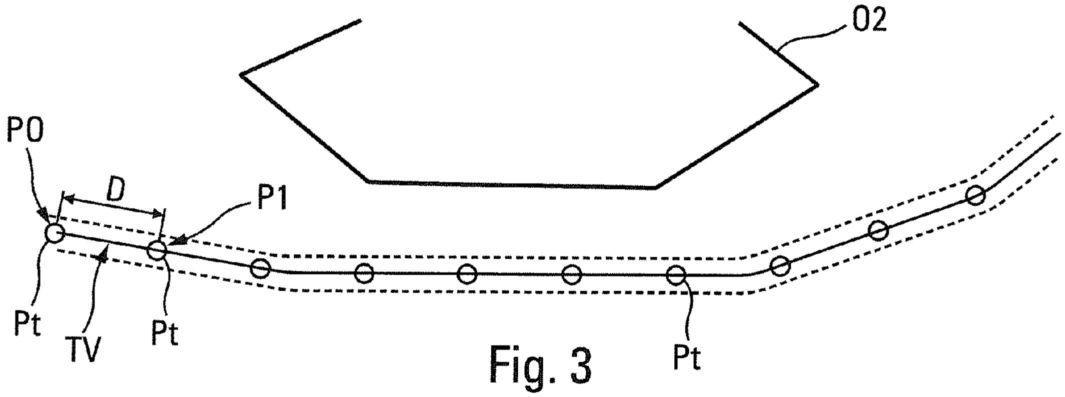

Furthermore, the trial point determination device 15 determines automatically, as trial points Pt, successive points along the flight trajectory TV, being separated one from the other, each time, by a constant distance D, as shown on FIG. 3. This distance D could be predetermined, or even be selected and entered in the device 1 by an operator using appropriate devices integral with the set 2.

Moreover, the passage time estimation device 16 estimates the passage time at each trial point Pt being considered. The prediction occurs on an interpolation between the trial points Pt provided by the flight management system. The time generated is produced with respect to a current time t0 at the current position P0 of the aircraft. The next trial point P1 is thus located at a distance D from P0 and is identified by a passage time t0+x.

Furthermore, the extrapolation device 17 extrapolates the positions of each one of the mobile obstacles O2 (aircrafts on a flight plane, stormy cells on analyzed vectors, etc.). The extrapolation occurs on a tolerance window aiming at overcoming the inaccuracies at the level of the predictions. This tolerance window could be predetermined, or even be selected and entered in the device 1 by an operator using appropriate devices being integral with the set 2.

For each one of the trial points Pt, the extrapolation device 17 analyzes the predicted passage time being associated therewith. Then, they carry out a position extrapolation based on the shifting vectors V1 to V6 stored in the associated database 3, 4. Each one of the mobile obstacles O2 is thus shifted for each one of the trial points Pt.

As previously set forth, one or more databases can be used containing mobile (or dynamic) obstacles O2. In particular, for the database 3 containing mobile obstacles O2 representing meteorological disturbance zones, the extrapolation device 17 extrapolates the position of each one of mobile obstacles O2 at passage time, taking into consideration determining points A1 to A6 defining the limits of the meteorological disturbance zones and of the vectors V1 to V6 illustrating the shift of the wind at determining points A1 to A6, such determining points A1 to A6 and such speed vectors V1 to V6 being contained in database 3; and/or for the database 4 containing mobile obstacles O2 representing surrounding aircrafts, the extrapolation device 17 extrapolates the position of each one of the mobile obstacles O2 at the passage time, taking into consideration information relative to the flight of the surrounding aircrafts, including the flight planes, being issued from the database 4. For implementing this extrapolation, other information can also be used, for example estimations of the trajectories of the surrounding aircrafts as a function, including, of their current course and their current speed.

Figure 4:
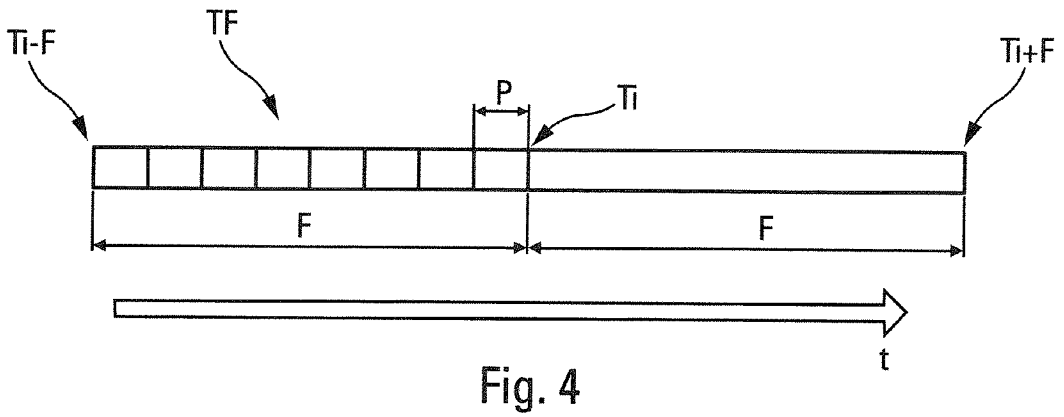

Furthermore, for implementing collision trials, the trial implementation device 18 uses a collision trial vector 22 having a length being predetermined, for example 6 nautical miles, or being selected by the pilot using appropriate devices integral, for example, with the set 2. For each one of the trial points Pt, they plot collision trial vectors 22 perpendicularly to the shifting vector 20 of the aircraft, on opposite sides of the trial point Pt being considered. Moreover, they implement a collision trial for the extrapolated positions of the mobile obstacles O2 at two successive instants TiA and TiB corresponding to the extreme times (Ti−F, Ti+F) of a time window FT being defined compared to the passage time Ti. As shown on the chronological plot shown on FIG. 4, the definition of this window FT, taking into consideration a duration F around the passage time Ti, allows to identify three determining (successive according to the time t) positions, respectively at the times Ti−F, Ti and Ti+F. The duration F represents a multiple of a pitch P. In a particular embodiment, this time window FT could be nil.

Figure 5:
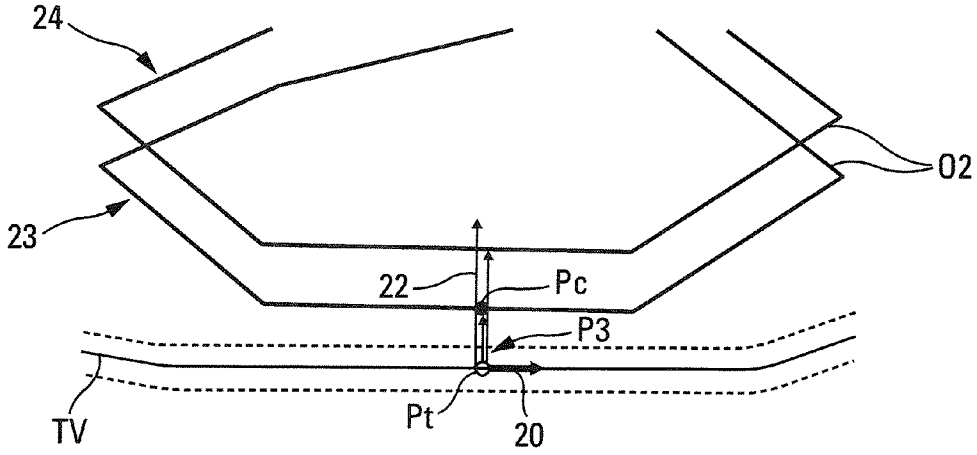
Figure 6:
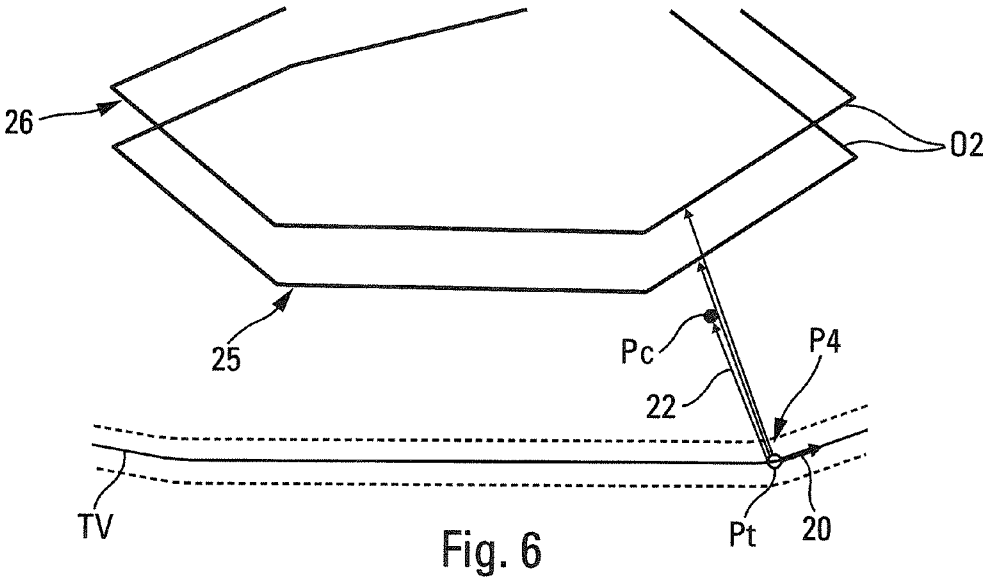

Thus, as an illustration:

in the example of FIG. 5, the collision trial being carried out for a mobile obstacle O2 at a trial point Pt located at a point P3 (with a passage time T3), is implemented compared to two extrapolated positions 23 and 24 of this mobile obstacle O2 respectively at times T3−F and T3+F; and in the example of FIG. 6, the collision trial being carried out for a mobile obstacle O2 at a trial point Pt located at a point P4 (with a passage time T4), is implemented compared to two extrapolated positions 25 and 26 of this mobile obstacle O2 respectively at times T4−F and T4+F.

Moreover, during such a collision trial:

if the trial vector 22 meets at least one obstacle 23, 24, the critical point Pc is defined at the position of the obstacle 23 being the closest to the trial point Pt being considered, as shown on the example of FIG. 5; and if the trial vector 22 does not meet any obstacle, the critical point Pc is defined at the end of said trial vector 22, as shown on the example of FIG. 6.

The trial (or interception) vector 22 is constrained by a limit length imposed, for example, by an operator. This length is associated with a maximum coverage margin. If the trial vector 22 does not meet any obstacles within this margin, the critical point Pc is thus defined as a function of the limit size. On the other hand, if a point is located within a hazardous cell, this point is identified as critical. A critical point Pc is specially processed upon the display for emphasizing the hazard associated with the trajectory TV.

Figure 7:
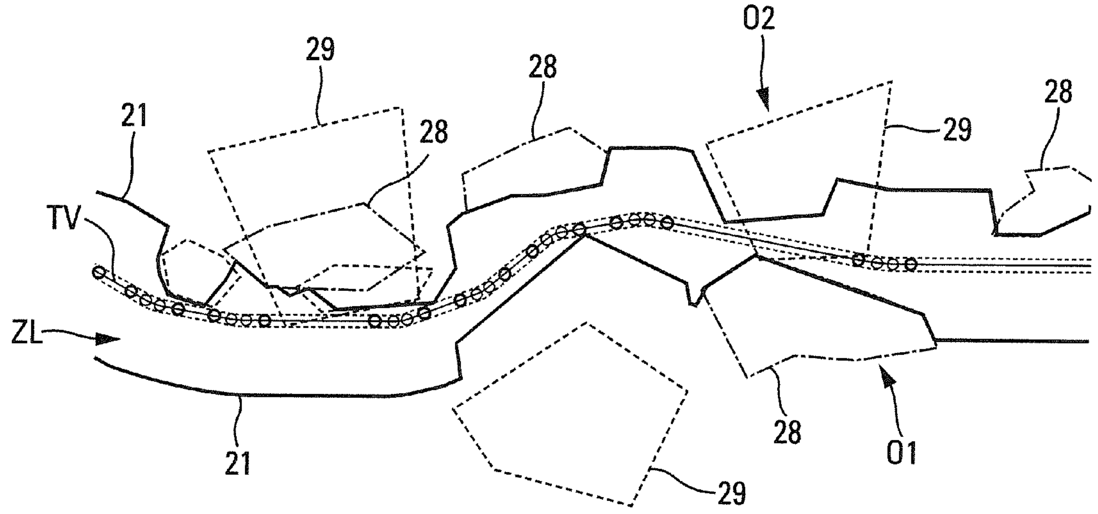
FIGS. 7 and 8 are schematic diagrams illustrating displays in two different situations.
Figure 8:
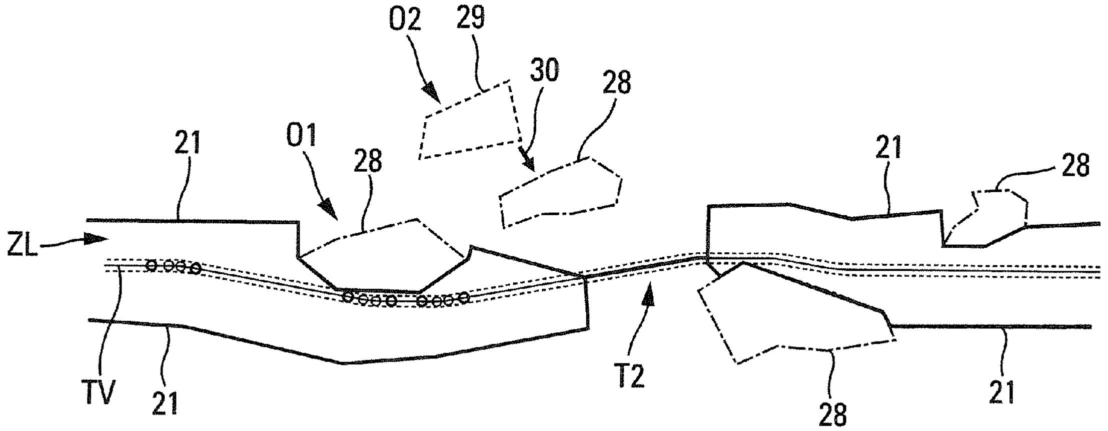

The plot according to the critical points Pc, on opposite sides of the reference trajectory TV, defines the limits 21 of the dynamic free zone ZL, as shown on FIGS. 7 and 8.

On these FIGS. 7 and 8:

the plots 21 in a thick solid line thus define, on opposite sides of the flight trajectory TV, the free zone ZL;

the plot TV in a thin solid line defines the flight trajectory being considered;

the plots 28 in mixed lines define the stationary obstacles O1; and the plots 29 with dashes define the mobile obstacles O1, in particular stormy zones that are going to progress.

Furthermore, if a part T2 of the flight trajectory TV goes through an (stationary or mobile) obstacle, this situation is emphasized on the display, in particular by a lack of free zone (plot 21) and by an overgloss of the impacted part of trajectory T2 (illustrated by a thick line on FIG. 8). On FIG. 8, going through a mobile obstacle 29 (the shifting vector 30 of which has been represented for exemplifying its shift) is thus emphasized by the above-mentioned characteristics.

The device 1 thus has, more specifically the following advantages:

it allows to support the crew in making a decision on board. The pilot's extrapolation ability does not necessarily enable him to evaluate whether the flight trajectory TV being followed is free of collision with a dynamic obstacle O2 (for example a stormy cell) moving in a tactical horizon. The device analyzes the potential evolutions of the environment and presents, by a simple display, the information allowing to evaluate the validity of the trajectory TV; and in addition to analyzing whether the trajectory goes through a zone being considered as hazardous, the method 1 provides a freedom zone (free zone ZL) on the whole trajectory, representing the maneuver margin of the aircraft. Displaying this zone ZL on the viewing screen 14 allows the crew to rapidly carry out an evaluation of the characteristics and of the piloting hazards along the trajectory TV.

The device therefore provides a single display representing all the evolutions of the environment with respect to the flight trajectory TV in a given time window.

The invention claimed is:

1. A method for aiding to evaluate a flight trajectory intended to be followed by an aircraft in a constrained environment, the method comprising:

A) receiving information with a processing unit from at least one first database containing mobile obstacles and at least one second database containing stationary obstacles relative at least to the environment of the aircraft, determining with the processing unit a plurality of successive points of the flight trajectory, referred to as trial points, and performing the following operations with the processing unit individually for each one of the successive trial points of the flight trajectory:

a) estimating the passage time of the aircraft at the trial point being considered;

b) extrapolating the positions of the mobile obstacles at the passage time by the first database; and c) implementing at least one collision trial for checking whether a trial vector, being provided perpendicularly to a shifting vector of the aircraft at the trial point, intercepts, on the one hand, mobile obstacles at extrapolated positions at the passage time, and on the other hand, stationary obstacles of the second database, and critical points are determined on opposite sides of the trial point being considered, depending on the result of the collision trial;

B) linking together the thus determined critical points so as to form a zone, referred to as a free zone, around the flight trajectory; and C) showing the flight trajectory with a viewing screen of the aircraft, as well as, the free zone allowing to aid to evaluate the flight trajectory.

2. The method according to claim 1, wherein step A further includes determining automatically as trial points, successive points along the flight trajectory, being separated from each other, each time, by a constant distance.

3. The method according to claim 1, wherein step a further includes estimating the passage time at the trial point being considered as a function of the passage time estimated at the previous trial point and of an estimated speed of the aircraft.

4. The method according to claim 1, wherein step A further includes receiving information from a first database containing mobile obstacles representing meteorological disturbance zones, and wherein step b further includes extrapolating each one of the mobile obstacles at the passage time, taking into consideration determining points defining the limits of the meteorological disturbance zones and of the wind speed vectors illustrating the wind shift at the determining points, the determining points and the speed vectors being issued from the first database.

5. The method according to claim 1, wherein step A further includes receiving information from a first database containing mobile obstacles representing surrounding aircrafts, and wherein step b further includes extrapolating the position of each one of the mobile obstacles at the passage time, taking into consideration information relative to the flight of the surrounding aircrafts, being issued from the first database.

6. The method according to claim 1, wherein step c further includes implementing a collision trial for the extrapolated positions of the mobile obstacles, at two successive times corresponding to extreme times of a time window being defined compared to the passage time.

7. The method according to claim 1, wherein at step c, the trial vector has a predetermined length.

8. The method according to claim 1, wherein at step c:

if the trial vector does not meet any obstacle, the critical point is located at the end of the trial vector; and if the trial vector meets at least one obstacle, the critical point is located at the position of the obstacle being the closest to the trial point being considered.

9. The method according to claim 1, wherein, if a part of the flight trajectory goes through any obstacle of one of the first and second databases, a collision is emphasized on the display achieved at step C.

10. The method according to claim 1, wherein at least the collision trial is implemented in a horizontal plane.

11. The method according to claim 1, wherein at least the collision trial is implemented in a vertical plane.

12. A device for aiding to evaluate a flight trajectory intended to be followed by an aircraft in a constrained environment, the device comprising:

at least one first database containing mobile obstacles, relative at least to the environment of the aircraft;

at least one second database containing stationary obstacles, relative at least to the environment of the aircraft;

a processing unit comprising:

a trial point determination device for automatically determining a plurality of successive points of the flight trajectory, referred to as trial points;

a passage time estimation device for estimating the passage time of the aircraft at each one of the trial points;

an extrapolation device for extrapolating the positions of the mobile obstacles at the passage time, by the first database; and a trial implementation device for implementing a collision trial with the aim to check whether a trial vector, being provided perpendicularly to a shifting vector of the aircraft at the trial point, intercepts, on the one hand, mobile obstacles at extrapolated positions at the passage time, and on the other hand, stationary obstacles of the second database, and for determining critical points on opposite sides of the trial point being considered, as a function of the result of the collision trial; and a display device for automatically showing, on a viewing screen of the aircraft, the flight trajectory, as well as a free zone linking together the critical points and allowing to aid to evaluate the flight trajectory.

13. The device according to claim 12, wherein the first database contains mobile obstacles representing meteorological disturbance zones, and wherein the extrapolation device extrapolates the position of each one of the mobile obstacles at the passage time taking into consideration determining points defining the limits of the meteorological disturbance zones and of the wind speed vectors illustrating the wind shift at the determining points, the determining points and the speed vectors being issued from the first database.

14. The device according to claim 12, wherein the first database contains mobile obstacles representing surrounding aircrafts, and wherein the extrapolation device extrapolates the position of each one of the mobile obstacles at the passage time, taking into consideration information relative to the flight of the surrounding aircrafts, being issued from the first database.

15. An aircraft, comprising a device as specified in claim 12.

* * * * *